United States Patent
Houzumi et al.

(10) Patent No.: US 9,831,736 B2
(45) Date of Patent: Nov. 28, 2017

(54) BUS BAR UNIT

(71) Applicant: KAYABA INDUSTRY CO., LTD., Minato-ku, Tokyo (JP)

(72) Inventors: Nobuji Houzumi, Kanagawa (JP); Tarou Matsumae, Kanagawa (JP); Yoshiteru Kurokawa, Kanagawa (JP); Suguru Sakamoto, Kanagawa (JP); Tohru Takimoto, Fukui (JP); Shingo Yamada, Fukui (JP)

(73) Assignee: KYB Corporation, Tokyo (JP)

( * ) Notice: Subject to any disclaimer, the term of this patent is extended or adjusted under 35 U.S.C. 154(b) by 153 days.

(21) Appl. No.: 14/436,084

(22) PCT Filed: Jan. 24, 2014

(86) PCT No.: PCT/JP2014/051511
§ 371 (c)(1),
(2) Date: Apr. 16, 2015

(87) PCT Pub. No.: WO2014/136491
PCT Pub. Date: Sep. 12, 2014

(65) Prior Publication Data
US 2015/0263580 A1    Sep. 17, 2015

(30) Foreign Application Priority Data

Mar. 8, 2013  (JP) .................................. 2013-047238

(51) Int. Cl.
*H02K 3/28*    (2006.01)
*H02K 3/50*    (2006.01)
(Continued)

(52) U.S. Cl.
CPC ............. *H02K 3/50* (2013.01); *H01R 25/161* (2013.01); *H02K 3/28* (2013.01); *H02K 3/38* (2013.01)

(58) Field of Classification Search
CPC ............ H02K 3/50; H02K 3/521; H02K 3/52; H02K 3/522; H02K 15/056; H02K 15/068;
(Continued)

(56) References Cited

U.S. PATENT DOCUMENTS 7,498,702 B2 *  3/2009  Migita ................... H02K 3/522
310/43
2011/0006625 A1   1/2011  Fujii et al.

FOREIGN PATENT DOCUMENTS

JP    2000-14069 A    1/2000
JP    2003-134728 A   5/2003
(Continued)

OTHER PUBLICATIONS

International Search Report and Written Opinion dated May 13, 2014 corresponding to International application No. PCT/JP2014/051511.

*Primary Examiner* — Burton Mullins
(74) *Attorney, Agent, or Firm* — Hauptman Ham, LLP

(57) ABSTRACT

In a bus bar unit in which a plurality of bus bars are formed by insert molding and arranged in an axial direction of a stator, each bus bar includes: a main body portion extending in a circumferential direction of the stator; a through hole formed in the main body portion, into which a support pin for supporting the main body portion of another bus bar is inserted in the axial direction of the stator during insert molding; and a projecting portion provided on a side portion of the main body portion in alignment with the through hole so as to increase a sectional area of the main body portion.

7 Claims, 8 Drawing Sheets

(51) Int. Cl.
*H01R 25/16* (2006.01)
*H02K 3/38* (2006.01)

(58) Field of Classification Search
CPC .......... H02K 15/0062; H02K 11/0094; H01R 25/161; B29C 45/14639
USPC .............................................. 310/71; 29/596
See application file for complete search history.

(56) References Cited

FOREIGN PATENT DOCUMENTS

| | | |
|---|---|---|
| JP | 2008-199889 A | 8/2008 |
| JP | 2009-219335 A | 9/2009 |
| JP | 2009-290921 A | 12/2009 |
| JP | 2011-88406 A | 5/2011 |
| JP | 2011-205875 A | 10/2011 |

\* cited by examiner

BUS BAR UNIT

TECHNICAL FIELD

The present invention relates to a bus bar unit connected to a winding of a motor or a power generator.

BACKGROUND ART

JP2011-205875A discloses a bus bar unit in which insulating resin is interposed between three annular bus bars, namely a U phase bus bar, a V phase bus bar, and a W phase bus bar, and the bus bars are laminated in an axial direction of a stator.

JP2011-88406A discloses a method of forming a bus bar unit by supporting a plurality of bus bars using support pins of a die, and insert-molding the bus bars in this condition using insulating resin.

SUMMARY OF INVENTION

A through hole is formed in a main body portion of a bus bar composing a bus bar unit, and during insert molding, a support pin is inserted into the through hole in order to support the main body portion of another bus bar. When a through hole is formed in the bus bar in this manner, a sectional area of the main body portion decreases, leading to an increase in conductor resistance in a through hole formation position during driving of a motor or the like, and as a result, a current amount flowing through the main body portion decreases.

An object of the present invention is to provide a bus bar unit with which a reduction in a current amount flowing through a bus bar can be suppressed even when a through hole is formed in a main body portion of the bus bar.

According to an aspect of the present invention, in a bus bar unit in which a plurality of bus bars are formed by insert molding and arranged in an axial direction of a stator, each of the plurality of bus bars includes: a main body portion extending along a circumferential direction of the stator; a through hole formed in the main body portion, into which a support pin for supporting the main body portion of a predetermined bus bar, from among the plurality of bus bars, is inserted in the axial direction of the stator during insert molding; and a projecting portion provided on a side portion of the main body portion in alignment with the through hole so as to increase a sectional area of the main body portion.

DESCRIPTION OF EMBODIMENTS

An embodiment of the present invention will be described below with reference to the attached figures.

Figure 1:
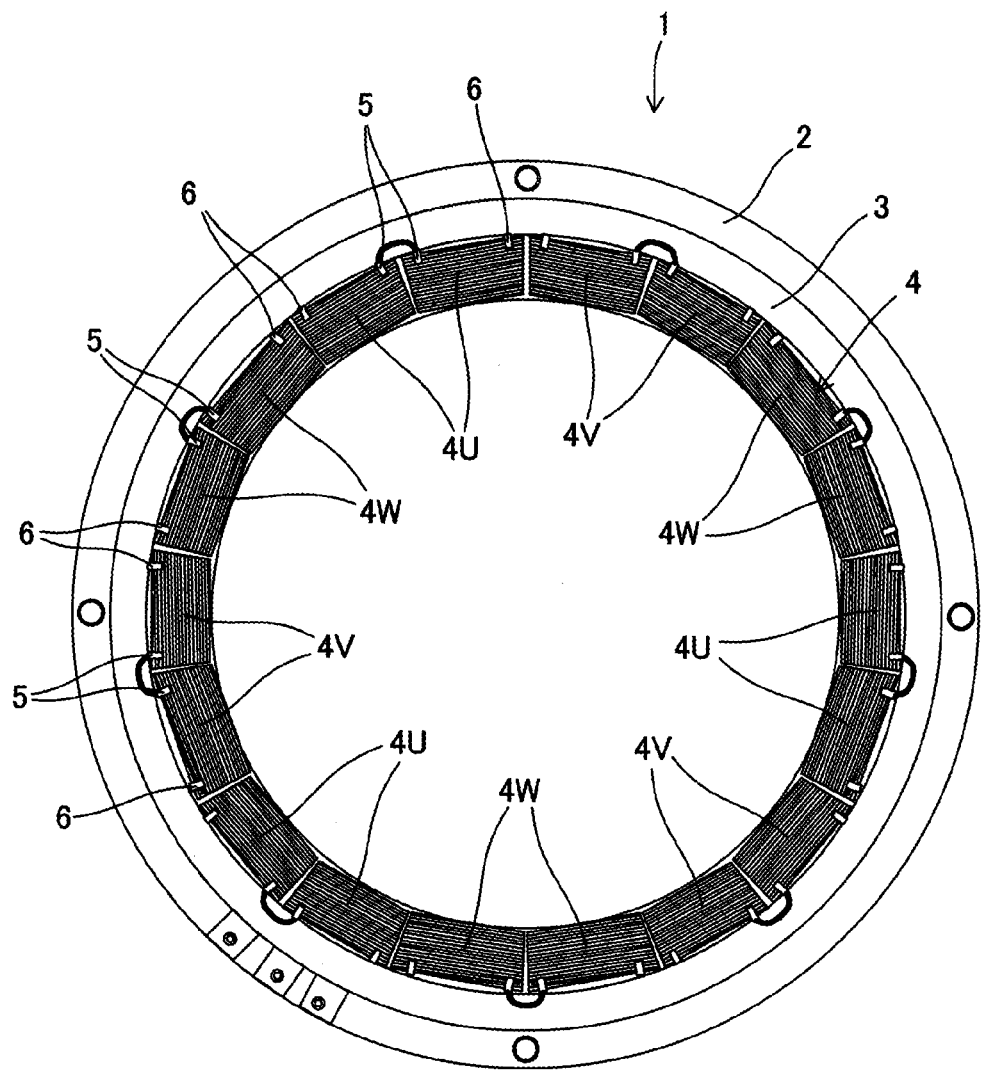
FIG. 1 is a schematic view of a stator composing a three-phase alternating current motor.

FIG. 1 is a view showing a configuration of a stator 1 composing a three-phase alternating current motor.

A plurality of teeth, not shown in the figure, are formed so as to project inwardly on an annular stator core 3 held within a housing 2. Copper wire is wound around each tooth, and coils 4 are composed of the wound conductor wires.

Eighteen coils 4 are disposed on the stator core 3 so as to extend annularly along a circumferential direction of the stator 1. The coils 4 are constituted by U phase coils 4U, V phase coils 4V, and W phase coils 4W, and single sets of two coils 4 of the same phase are disposed at 120 degree intervals in the circumferential direction of the stator 1. Hence, a set of U phase coils 4U, a set of V phase coils 4V, and a set of W phase coils 4W are disposed in that order three times along the circumferential direction of the stator 1.

In adjacent coils 4U, 4V, 4W of the same phase, respective winding terminals 5 are connected to each other. Further, the U phase coils 4U, V phase coils 4V, and W phase coils 4W are connected to a bus bar unit 100 (see FIG. 2) via further winding terminals 6.

Figure 2:
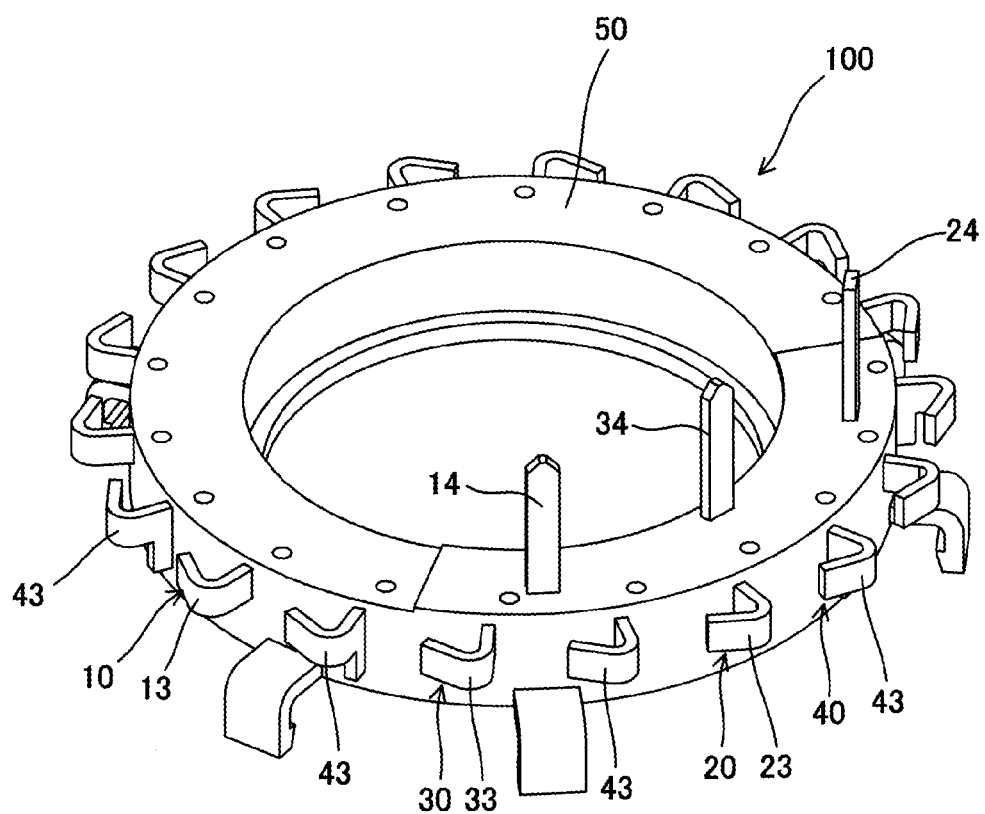
FIG. 2 is a perspective view of a bus bar unit according to an embodiment.
Figure 3:
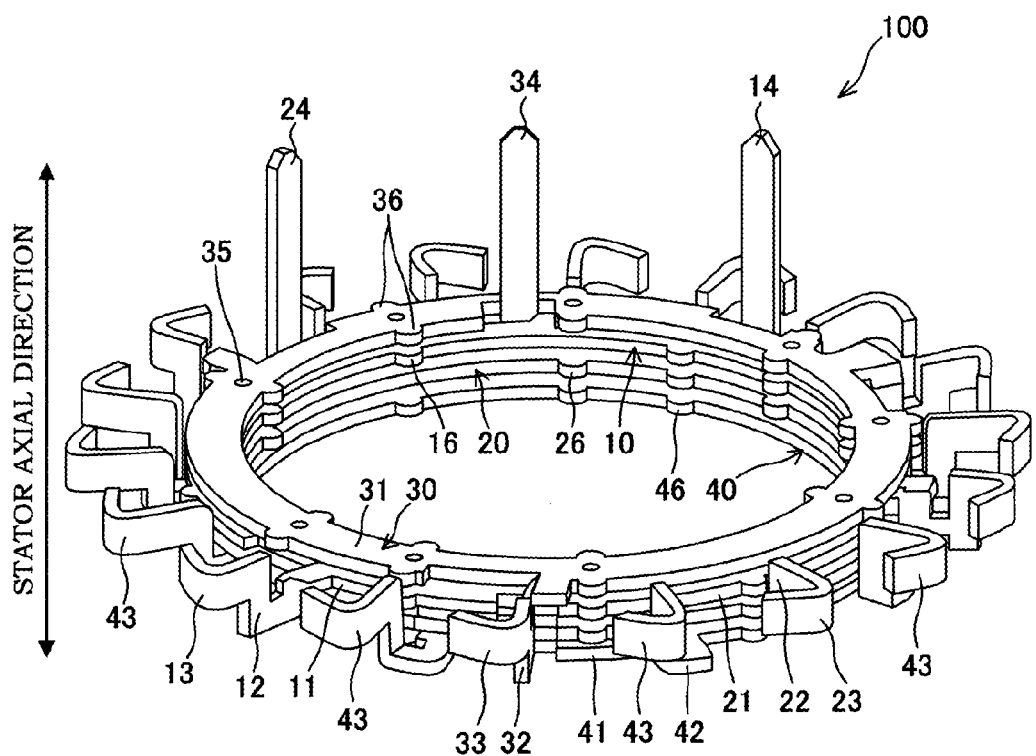
FIG. 3 is a perspective view of the bus bar unit in a condition where an insulating portion has been omitted.

Referring to FIGS. 2 and 3, the bus bar unit 100, which is provided in a motor, and a U phase bus bar 10, a V phase bus bar 20, a W phase bus bar 30, and an N phase bus bar 40 serving as a neutral point bus bar, which together constitutes the bus bar unit 100, will be described.

The bus bar unit 100 shown in FIG. 2 is attached to an axial direction end portion of the stator 1 (see FIG. 1) concentrically with the stator 1.

As shown in FIGS. 2 and 3, the bus bar unit 100 includes the U phase bus bar 10 connected to the U phase coils 4U, the V phase bus bar 20 connected to the V phase coils 4V, the W phase bus bar 30 connected to the W phase coils 4W, the N phase bus bar 40 connected to the coils 4U, 4V, 4W of the respective phases, and insulating portions 50 that maintain the respective bus bars 10, 20, 30, 40 in an insulated condition. The bus bar unit 100 is an annular member formed integrally by insert-molding the bus bars 10, 20, 30, 40 of the respective phases using insulating resin. The insulating portions 50 are formed from hardened insulating resin.

As shown in FIG. 3, the U phase bus bar 10 includes a main body portion 11 formed as an annular plate-shaped member, an extending portion 12 extending outward in a radial direction of the stator 1 from the main body portion 11, a coil connecting portion 13 provided on an outside end of the extending portion 12, and a U phase terminal 14 that extends from the main body portion 11 in an axial direction of the stator 1 and is connected to an external wire.

The main body portion 11 extends along the circumferential direction of the stator 1 such that a plate thickness direction thereof matches the axial direction of the stator 1. Three extending portions 12 are provided at equal intervals in a circumferential direction of the main body portion 11. The coil connecting portion 13 is formed in a hook shape on a tip end of the extending portion 12. The coil connecting portions 13 are connected to the winding terminals 6 of the U phase coils 4U.

The V phase bus bar 20 includes a main body portion 21 formed as an annular plate-shaped member, an extending portion 22 extending outward in the radial direction of the stator 1 from the main body portion 21, a coil connecting portion 23 provided on an outside end of the extending portion 22, and a V phase terminal 24 that extends from the main body portion 21 in the axial direction of the stator 1 and is connected to an external wire.

The main body portion 21 extends along the circumferential direction of the stator 1 such that a plate thickness direction thereof matches the axial direction of the stator 1. Three extending portions 22 are provided at equal intervals in a circumferential direction of the main body portion 21. The coil connecting portion 23 is formed in a hook shape on a tip end of the extending portion 22. The coil connecting portions 23 are connected to the winding terminals 6 of the V phase coils 4V.

The W phase bus bar 30 includes a main body portion 31 formed as an annular plate-shaped member, an extending portion 32 extending outward in the radial direction of the stator 1 from the main body portion 31, a coil connecting portion 33 provided on an outside end of the extending portion 32, and a W phase terminal 34 that extends from the main body portion 31 in the axial direction of the stator 1 and is connected to an external wire.

The main body portion 31 extends along the circumferential direction of the stator 1 such that a plate thickness direction thereof matches the axial direction of the stator 1. Three extending portions 32 are provided at equal intervals in a circumferential direction of the main body portion 31. The coil connecting portion 33 is formed in a hook shape on a tip end of the extending portion 32. The coil connecting portions 33 are connected to the winding terminals 6 of the W phase coils 4W.

The N phase bus bar 40 includes a main body portion 41 formed as an annular plate-shaped member, an extending portion 42 extending outward in the radial direction of the stator 1 (see FIG. 1) from the main body portion 41, and a coil connecting portion 43 provided on an outside end of the extending portion 42.

The main body portion 41 extends along the circumferential direction of the stator 1 such that a plate thickness direction thereof matches the axial direction of the stator 1. Nine extending portions 42 are provided at equal intervals in a circumferential direction of the main body portion 41. The coil connecting portion 43 is formed in a hook shape on a tip end of the extending portion 42. The coil connecting portions 43 are connected to the winding terminals 6 of the U phase coils 4U, the winding terminals 6 of the V phase coils 4V, and the winding terminals 6 of the W phase coils 4W.

The U phase bus bar 10, V phase bus bar 20, W phase bus bar 30, and N phase bus bar 40 described above are formed by performing bending processing or the like on a member punched out from a conductive plate-shaped material.

As shown in FIGS. 2 and 3, the bus bar unit 100 is composed of arranging (laminating) the N phase bus bar 40, the V phase bus bar 20, the U phase bus bar 10, and the W phase bus bar 30 in that order from the stator 1 side. The insulating portions 50 are interposed between the adjacent bus bars 10, 20, 30, 40 of the respective phases such that an electrical insulating property is secured between the bus bars 10, 20, 30, 40 of the respective phases by the insulating portions 50. Relative positions of the bus bars 10, 20, 30, 40 of the respective phases in the stator circumferential direction are adjusted such that the extending portions 12, 22, 32, 42 and the coil connecting portions 13, 23, 33, 43 deviate from each other at equal intervals in the stator circumferential direction. The bus bar unit 100 supplies a current supplied from a power supply, not shown in the figures, to the U phase coils 4U, the V phase coils 4V, and the W phase coils 4W via the U phase terminal 14, the V phase terminal 24, and the W phase terminal 34, which serve as external terminals.

The bus bar unit 100 is formed by insert-molding the U phase bus bar 10, the V phase bus bar 20, the W phase bus bar 30, and the N phase bus bar 40, which are disposed in a die 200 (see FIG. 5), using insulating resin.

Figure 5:
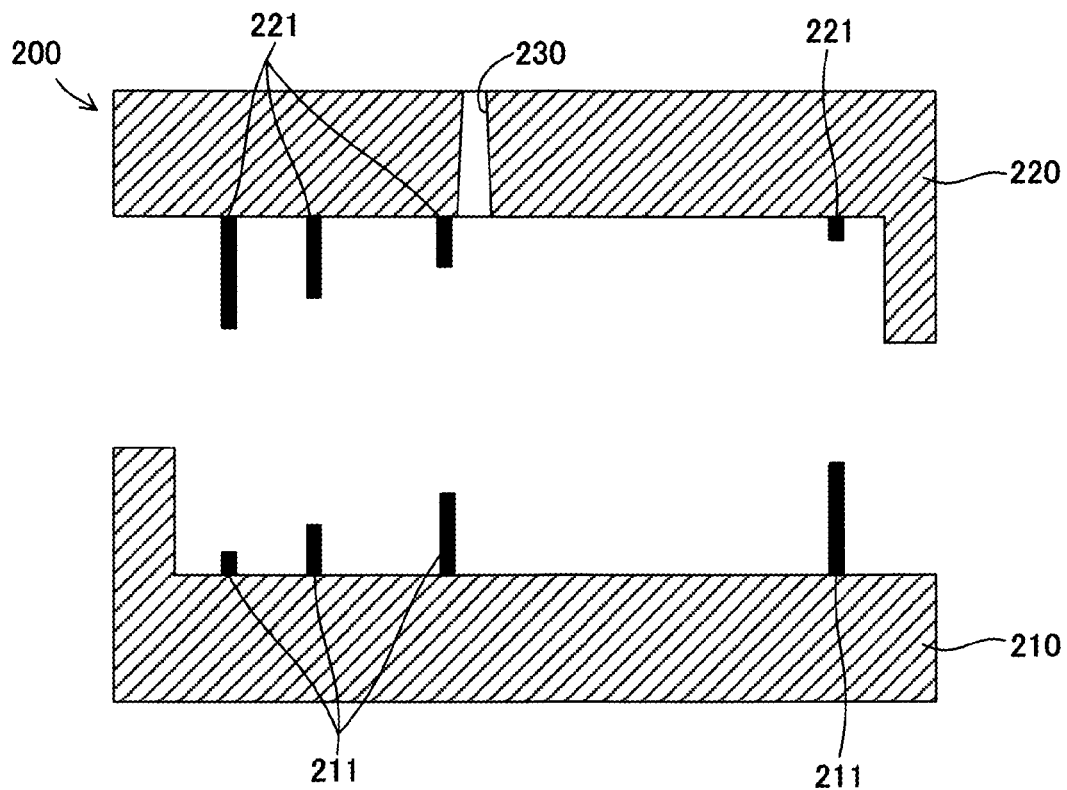
FIG. 5 is a schematic sectional view of a die used for insert molding.

As shown in FIG. 5, the die 200 includes a lower mold 210 disposed on a lower side in a vertical direction, and an upper mold 220 disposed above the lower mold 210.

The upper mold 220 includes an injection hole 230 penetrating the upper mold 220 in the vertical direction, through which molten insulating resin is injected into the die 200.

Support pins 221 for supporting upper surfaces of the main body portions 11, 21, 31, 41 of the bus bars 10, 20, 30, 40 of the respective phases are provided on the upper mold 220, and support pins 211 for supporting lower surfaces of the main body portions 11, 21, 31, 41 of the bus bars 10, 20, 30, 40 of the respective phases are provided on the lower mold 210. Three support pins 221 are provided for the bus bars 10, 20, 30, 40 of each phase, and three support pins 211 are likewise provided for the bus bars 10, 20, 30, 40 of each phase. Respective lengths of the support pins 211, 221 are set in accordance with vertical direction positions of the bus bars 10, 20, 30, 40 of the respective phases supported thereby.

It should be noted that in FIG. 5, for the sake of simplicity, only four upper-lower sets of the support pins 211, 221 are shown, but in actuality, twelve upper-lower sets of the support pins 211, 221 are provided. The number of support pins 211, 221 is not limited thereto, and may be set as desired according to requirements.

Figure 6:
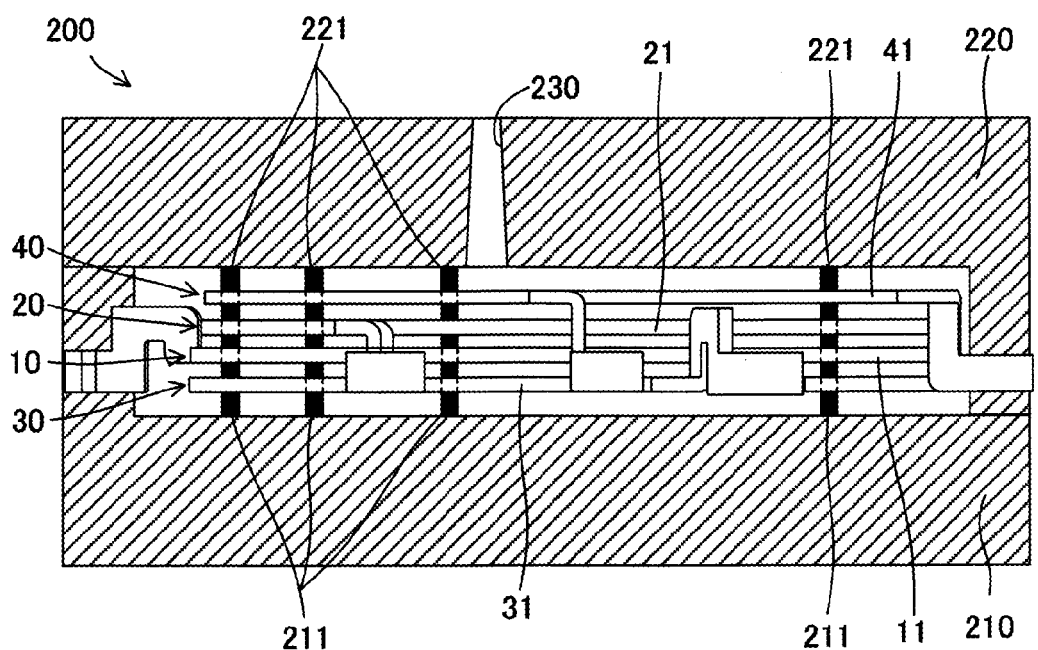
FIG. 6 is a schematic view illustrating the insert molding.

As shown in FIG. 6, during insert molding, the bus bars 10, 20, 30, 40 of the respective phases are held in the die 200 by the support pins 211, 221 in a laminated condition such that predetermined gaps are provided between the bus bars 10, 20, 30, 40 in the vertical direction. It should be noted that in FIG. 6, the terminals 14, 24, 34 of the respective phases, a part of the extending portions 12, 22, 32, 42, and so on have been omitted.

Figure 4:
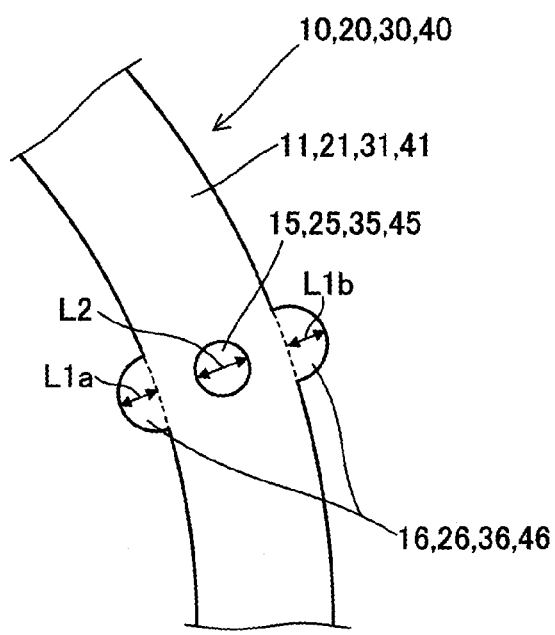
FIG. 4 is a partial front view of a bus bar.

As regards the manner in which the support pins 211, 221 support the main body portions 11, 21, 31, 41 of the bus bars 10, 20, 30, 40 of the respective phases, as shown in FIG. 4, through holes 15 are formed to penetrate the main body portion 11 of the U phase bus bar 10 in order to insert the support pins 211, 221 for supporting the bus bars 20, 30, 40 of the respective phases other than the U phase bus bar 10 in the stator axial direction.

As shown in FIG. 4, nine through holes 15 are formed in widthwise central positions of the main body portion 11 at predetermined intervals in the stator circumferential direction. The number of formed through holes 15 is not limited thereto, and may be set as desired in accordance with the number of support pins 211, 221.

Further, projecting portions 16 are formed integrally with respective side portions of the main body portion 11 of the U phase bus bar 10 in alignment with the formation positions of the through holes 15 so as to increase a sectional area of the main body portion 11. The projecting portions 16 are semicircular plate-shaped members that project in the stator radial direction from an inner periphery and an outer periphery of the main body portion 11. A thickness of the projecting portions 16 is set to be identical to a plate thickness of the main body portion 11. It should be noted that the projecting portions 16 may be provided on the main body portion 11 as separate members rather than being formed integrally with the main body portion 11.

The projecting portions 16 extend in the stator circumferential direction so as to pass by the sides of the through holes 15. A projection amount L1 of a pair of the projecting portions 16 in the stator radial direction is expressed by a sum of projection amounts L1$a$, L1$b$ of the inside and outside projecting portions 16 in the stator radial direction, and is set to be greater than a hole length L2 of the through hole 15 in the stator radial direction.

By providing the U phase bus bar 10 with the projecting portions 16 that increase the sectional area of the main body portion 11 on the sides of the through holes 15 in this manner, an increase in conductor resistance in the formation positions of the through holes 15 during motor driving or the like, leading to a reduction in a current amount that can be passed through the main body portion 11, can be suppressed.

As shown in FIG. 4, through holes 25, 35, 45 and projecting portions 26, 36, 46 having identical functions to the through holes 15 and the projecting portions 16 of the U phase bus bar 10 are formed likewise in the bus bars 20, 30, 40 of the respective phases other than the U phase bus bar 10. Likewise with respect to the V phase bus bar 30, the W phase bus bar 30, and the N phase bus bar 40, therefore, a reduction in the current amounts that can be passed through the main body portions 21, 31, 41 in the formation positions of the through holes 25, 35, 45 can be suppressed.

Next, referring to FIG. 6, insert molding of the bus bar unit 100 will be described. As shown in FIG. 6, the bus bars 10, 20, 30, 40 of the respective phases are set on the lower mold 210 in order of the W phase bus bar 30, the U phase bus bar 10, the V phase bus bar 20, and the N phase bus bar 40. The upper mold 220 is then closed onto the lower mold 210.

With the upper mold 220 closed, the main body portion 31 of the W phase bus bar 30 is sandwiched between the support pins 211 of the lower mold 210 and the support pins 221 of the upper mold 220 passing through the through holes 15, 25, 45 in the bus bars 10, 20, 40 of the respective phases other than the W phase bus bar 30. At this time, the main body portion 11 of the U phase bus bar 10 is sandwiched between the support pins 211 of the lower mold 210 passing through the through holes 35 in the W phase bus bar 30 and the support pins 221 of the upper mold 220 passing through the through holes 25, 45 in the V phase bus bar 20 and the N phase bus bar 40. The main body portion 21 of the V phase bus bar 20 is sandwiched between the support pins 211 of the lower mold 210 passing through the through holes 15, 35 in the U phase bus bar 10 and the W phase bus bar 30 and the support pins 221 of the upper mold 220 passing through the through holes 45 in the N phase bus bar 40. The main body portion 41 of the N phase bus bar 40 is sandwiched between the support pins 211 of the lower mold 210 passing through the through holes 15, 25, 35 in the bus bars 10, 20, 30 of the respective phases other than the N phase bus bar 40 and the support pins 221 of the upper mold 220.

By sandwiching the main body portions 11, 21, 31, 41 from above and below between the support pins 211, 221 in this manner, the bus bars 10, 20, 30, 40 of the respective phases are held in a laminated condition such that predetermined gaps are maintained between the bus bars 10, 20, 30, 40 in the vertical direction. In this condition, molten insulating resin is injected into a space defined between the upper mold 220 and the lower mold 210 through the injection hole 230 in the upper mold 220. Since the bus bars 10, 20, 30, 40 of the respective phases are sandwiched between the support pins 211, 221, movement of the bus bars 10, 20, 30, 40 of the respective phases due to pressure from the insulating resin is restricted. As a result, an insulation distance can be secured between the adjacent bus bars 10, 20, 30, 40 of the respective phases.

After hardening the insulating resin, the upper mold 220 and the lower mold 210 are removed, whereby the bus bar unit 100 shown in FIG. 2 is completed.

According to the embodiment described above, following effects are obtained.

The through holes 15, 25, 35, 45 for inserting the support pins 211, 221 of the die 200 are provided in the main body portions 11, 21, 31, 41 of the bus bars 10, 20, 30, 40 of the respective phases, and the projecting portions 16, 26, 36, 46 are provided on the side portions of the main body portions 11, 21, 31, 41 in alignment with the formation positions of the through holes 15, 25, 35, 45. Hence, a reduction in the sectional area of the main body portions 11, 21, 31, 41 in the formation positions of the through holes 15, 25, 35, 45 can be suppressed, and as a result, a reduction in the current amounts that can be passed through the main body portions 11, 21, 31, 41 during motor driving or the like can be suppressed.

The projecting portions 16, 26, 36, 46 of the bus bars 10, 20, 30, 40 of the respective phases extend along the stator circumferential direction so as to pass by the sides of the through holes 15, 25, 35, 45. The projection amount L1 of the pairs of projecting portions 16, 26, 36, 46 in the stator radial direction is set to be greater than the hole length L2 of the through holes 15, 25, 35, 45 in the stator radial direction, and therefore a reduction in the sectional area of the main body portions 11, 21, 31, 41 in the formation positions of the through holes 15, 25, 35, 45 can be suppressed more reliably. As a result, the effect of suppressing a current amount reduction in the formation positions of the through holes 15, 25, 35, 45 can be increased.

Next, referring to FIGS. 7 and 8, the bus bars 10, 20, 30, 40 of the respective phases according to modified examples will be described.

Figure 7:
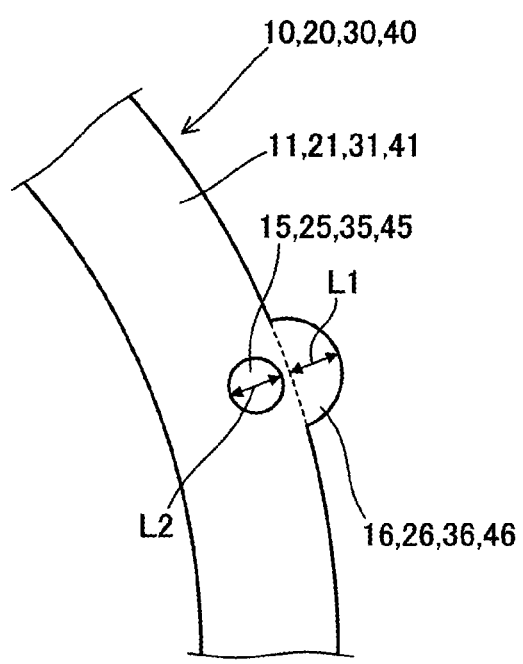
FIG. 7 is a partial front view of a bus bar according to a first modified example.

In the bus bars 10, 20, 30, 40 of the respective phases according to a first modified example, shown in FIG. 7, the through holes 15, 25, 35, 45 are formed in positions close to the outer peripheries of the main body portions 11, 21, 31, 41.

Further, the projecting portions 16, 26, 36, 46 are formed to project outwardly from the outer peripheries of the main body portions 11, 21, 31, 41 on the side of the through holes 15, 25, 35, 45. The projecting portions 16, 26, 36, 46 are formed as semicircular plate-shaped members. The projection amount L1 of the projecting portions 16, 26, 36, 46 in the stator radial direction is set to be greater than the hole length L2 of the through holes 15, 25, 35, 45 in the stator radial direction.

Likewise when the bus bars 10, 20, 30, 40 of the respective phases are configured as shown in FIG. 7, a reduction in the current amounts that can pass through the main body portions 11, 21, 31, 41 in the formation positions of the through holes 15, 25, 35, 45 can be suppressed. Further, since the projecting portions 16, 26, 36, 46 are formed on only one side portion of the main body portions 11, 21, 31, 41, the bus bars 10, 20, 30, 40 of the respective phases can be punched out from the material more easily, enabling an improvement in yield during a bus bar punching operation.

It should be noted that in the U phase bus bar 10, the V phase bus bar 20, the W phase bus bar 30, and the N phase bus bar 40, the through holes 15, 25, 35, 45 may be formed in positions close to the inner peripheries of the main body portions 11, 21, 31, 41, and the projecting portions 16, 26, 36, 46 may be formed on the side of the through holes 15, 25, 35, 45 so as to project inwardly from the inner peripheries of the main body portions 11, 21, 31, 41.

Figure 8:
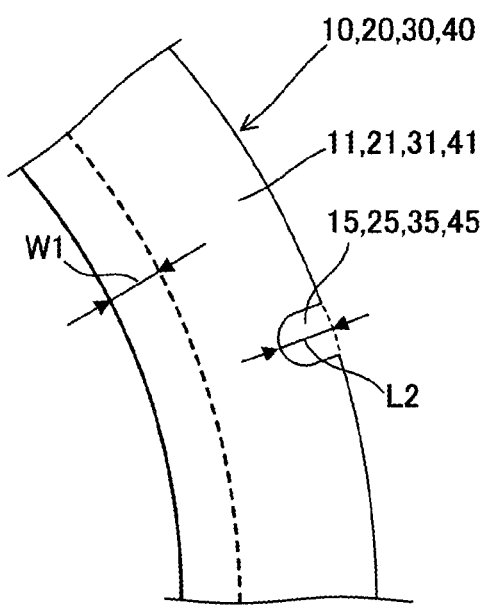
FIG. 8 is a partial front view of a bus bar according to a second modified example.

In the bus bars 10, 20, 30, 40 of the respective phases according to a second modified example, shown in FIG. 8, the through holes 15, 25, 35, 45 are formed as U-shaped cutouts opened in the outer peripheries of the main body portions 11, 21, 31, 41.

Further, the main body portions 11, 21, 31, 41 are formed to be wider than the main body portions of the bus bars shown in FIGS. 4 and 7. More specifically, a width of the main body portions 11, 21, 31, 41 of the bus bars 10, 20, 30, 40 of the respective phases is set to be greater than the width of the main body portions of the bus bars shown in FIGS. 4 and 7 by W1. The increased width W1 of the main body portions 11, 21, 31, 41 widened in the stator radial direction in this manner is set to be greater than the hole length L2 of the through holes 15, 25, 35, 45 in the stator radial direction.

Likewise when the bus bars 10, 20, 30, 40 of the respective phases are configured as shown in FIG. 8, a reduction in the current amounts that can pass through the main body portions 11, 21, 31, 41 in the formation positions of the through holes 15, 25, 35, 45 can be suppressed. Further, since the bus bars 10, 20, 30, 40 of the respective phases have a simple shape obtained by increasing the width of the main body portions 11, 21, 31, 41 in accordance with the hole length of the through holes 15, 25, 35, 45, the bus bars 10, 20, 30, 40 of the respective phases can be punched out from the raw material more easily, enabling an improvement in yield during the bus bar punching operation.

It should be noted that in the U phase bus bar 10, the V phase bus bar 20, the W phase bus bar 30, and the N phase bus bar 40, the through holes 15, 25, 35, 45 may be cut out into a U shape so as to open into the inner peripheries of the main body portions 11, 21, 31, 41, and the width of the main body portions 11, 21, 31, 41 may be set to be greater than the width of the main body portions of the bus bars shown in FIGS. 4 and 7 by W1.

An embodiment of the present invention was described above, but the above embodiment is merely one example of an application of the present invention, and the technical scope of the present invention is not limited to the specific configurations of the above embodiment.

This embodiment is not limited to a case in which the four bus bars 10, 20, 30, 40 of the respective phases are insert-molded, and may be applied to any case in which two or more bus bars are insert-molded in a laminated condition.

In this embodiment, the bus bar unit 100 is applied to a motor, but the bus bar unit 100 may also be applied to a power generator.

In this embodiment, the U phase bus bar 10, V phase bus bar 20, W phase bus bar 30, and N phase bus bar 40 are annular, but may be arc-shaped.

In this embodiment, a three-phase alternating current motor including the eighteen coils 4 was cited as an example, but the number of coils is not limited thereto.

In this embodiment, the bus bar unit 100 is formed by insert-molding the four bus bars 10, 20, 30, 40 of the respective phases altogether, but the bus bar unit 100 may be formed by performing insert molding a plurality of times. For example, a primary molded member is formed by executing primary insert molding, in which two bus bars are laminated via a predetermined gap in a primary die and then insulating resin is injected into the primary die. The bus bar unit 100 may then be formed by executing secondary insert molding, in which the primary molded member is disposed in a secondary die together with the remaining bus bars, and then insulating resin is injected into the secondary die.

Further, in this embodiment, the bus bars 10, 20, 30, 40 of the respective phases are supported via the support pins 211, 221 of the die 200 during insert molding, but the bus bar support method is not limited thereto. For example, a support member other than the support pins 211, 221 may be provided in the die 200, and the bus bars 10, 20, 30, 40 of the respective phases may be supported using the support member and the support pins 211, 221.

Furthermore, in this embodiment, the bus bars 10, 20, 30, 40 of the respective phases are disposed in order of the N phase bus bar 40, the V phase bus bar 20, the U phase bus bar 10, and the W phase bus bar 30 from the stator side, but the bus bars 10, 20, 30, 40 may be arranged in a different order.

This application claims priority based on JP application number 2013-47238, filed with the Japan Patent Office on Mar. 8, 2013, the entire contents of which are incorporated into this specification by reference.

The invention claimed is:

1. A bus bar unit in which a plurality of bus bars are formed by insert molding and arranged in an axial direction of a stator, wherein each of the plurality of bus bars comprises:
    a main body portion extending in a circumferential direction of the stator;
    a through hole which is formed in the main body portion, and into which a support pin for supporting the main body portion of a predetermined bus bar, from among the plurality of bus bars, is inserted in the axial direction of the stator during said insert molding; and
    an inner projecting portion and an outer projecting portion provided respectively on an inner side portion and an outer side portion of the main body portion in a radial direction of the stator so as to increase a sectional area of the main body portion in the circumferential direction of the stator,
    wherein a total projecting amount of (i) a projecting amount in the radial direction of the inner projecting portion and (ii) a projecting amount in the radial direction of the outer projecting portion of the main body portion is larger than a hole length of the through hole in the radial direction of the stator.

2. The bus bar unit as defined in claim 1,
    wherein the plurality of bus bars comprises four bus bars, and a plurality of through holes is provided in each of the four bus bars at intervals in the circumferential direction of the stator, and
    wherein, in the axial direction of the stator, the plurality of through holes provided in three bus bars is arranged along an axis parallel to the axial direction of the stator.

3. The bus bar unit as defined in claim 1,
    wherein a space between an extending portion extending outwardly in the radial direction of the stator from the main body portion and the outer projecting portion is filled with an insulating resin, and
    wherein the extending portion has, at a distal end thereof, a coil connecting portion, and the coil connecting portion is connected to a winding terminal.

4. The bus bar unit as defined in claim 1,
    wherein each bus bar among the plurality of bus bars comprises through holes in the main body portion, each of the through holes is at a corresponding location among a plurality of locations arranged at intervals along the circumferential direction of the stator, and
    wherein, at each location among the plurality of locations, through holes of at least two bus bars among the plurality of bus bars are aligned with each other along an axis parallel to the axial direction of the stator, wherein the aligned through holes are arranged for receiving a support pin during said insert molding, and a further bus bar among the plurality of bus bars and different from said at least two bus bars does not have a through hole at said location, wherein said further bus bar is arranged to be supported by the support pin received in the aligned through holes during said insert molding.

5. The bus bar unit as defined in claim 4, further comprising:

an insulating resin in which the plurality of bus bars is embedded by said insert molding, wherein the insulating resin is absent inside the aligned through holes.

6. The bus bar unit as defined in claim 1, wherein the plurality of bus bars comprises four bus bars, wherein each bus bar among the four bus bars comprises through holes in the main body portion, each of the through holes is at a corresponding location among a plurality of locations arranged at intervals along the circumferential direction of the stator, and wherein, at each location among the plurality of locations, three through holes of three bus bars among the four bus bars are aligned with each other along an axis parallel to the axial direction of the stator, and a fourth bus bar among the plurality of bus bars and different from said three bus bars does not have a through hole at said location.

7. The bus bar unit as defined in claim 6, further comprising:

an insulating resin in which the four bus bars are embedded by said insert molding, wherein the insulating resin is absent inside the aligned through holes.

* * * * *